United States Patent [19]

Ito et al.

[11] Patent Number: 5,564,737
[45] Date of Patent: Oct. 15, 1996

[54] VEHICULAR PASSENGER PROTECTION SYSTEM

[75] Inventors: Keiji Ito, Hoi-gun; Mitsuhiko Masegi, Nukata-gun, both of Japan

[73] Assignee: Nippondenso Co., Ltd., Kariya, Japan

[21] Appl. No.: 301,426

[22] Filed: Sep. 9, 1994

[30] Foreign Application Priority Data

Sep. 14, 1993 [JP] Japan .................................. 5-229208

[51] Int. Cl.$^6$ .................................................. B60R 21/16
[52] U.S. Cl. ......................... 280/735; 307/10.1; 340/436
[58] Field of Search .................................. 280/734, 735; 307/10.1; 340/436, 438; 180/211, 282; 323/284, 285, 297, 303, 351

[56] References Cited

U.S. PATENT DOCUMENTS

| 4,740,741 | 4/1988 | Andres et al. | 323/303 |
|---|---|---|---|
| 5,023,468 | 6/1991 | Drobny et al. | 307/10.1 |
| 5,204,547 | 4/1993 | Schumacher et al. | 307/10.1 |
| 5,216,284 | 6/1993 | Mattes et al. | 307/10.1 |
| 5,261,694 | 11/1993 | White et al. | 280/735 |
| 5,311,065 | 5/1994 | Kondo | 307/10.1 |
| 5,432,385 | 7/1995 | Kincaid et al. | 307/10.1 |
| 5,442,244 | 8/1995 | Furui | 180/282 X |
| 5,459,449 | 10/1995 | Rava, Jr. et al. | 340/438 |

FOREIGN PATENT DOCUMENTS 4506295  10/1992  Japan .

Primary Examiner—Christopher P. Ellis
Attorney, Agent, or Firm—Cushman, Darby & Cushman

[57] ABSTRACT

A passenger protection system for a motor vehicle having a supplementary power supply for operating the protection system has a relatively small capacity. This enables the system to be made more compact and lighter. The vehicle includes a battery disposed in parallel with two diodes via a key switch. Output form one diode charges a back-up condenser. Discharge energy from the back-up condenser is provided to the airbag circuit via a switch. The output of the other diode is also provided to the airbag circuit. The switch is controlled by a detection circuit that judges whether energy is supplied from the back-up condenser to the airbag circuit. An ignition device is set so that the airbag may be operated via a switch which is turned on with deceleration so that the power is provided responsive to a collision determination.

25 Claims, 4 Drawing Sheets

VEHICULAR PASSENGER PROTECTION SYSTEM

BACKGROUND OF THE INVENTION

1. Field of the Invention:

The present invention relates to a passenger protection system for vehicles- More particularly, the present invention relates to a system for controlling and actuating an airbag system when the vehicle is in a collision and thereby protecting the passengers of the vehicle from injury.

2. Related Art:

Airbag systems that are intended to protect the passengers of motor vehicles from injury resulting from collisions. Such airbag systems must inflate promptly in a collision to protect the passengers from injury. For example, in the case of a driver side airbag, the airbag must be quickly inflated by gas that is charged via ignition of an ignition system located in the steering wheel or steering wheel shaft in front of the driver's seat. The shock of a collision is detected by a collision detecting system, which transmits a signal to the airbag ignition system, in turn causing ignition of the airbag. In this manner the driver is protected from injury. Such a system is also used with respect to passenger side airbags.

The ignition system receives power from a battery power source included in the vehicle. Should the ignition system be disconnected from the battery, which often occurs in a collision, normal operation of the ignition system is not assured nor is inflation of the airbag. Thus, the airbag system includes a supplementary power source such as a back-up condenser for storing electrical power. For power to be supplied to the airbag without fail at the time of a collision, charging power must be always available from the battery installed in the vehicle.

However, since the supplementary power source such as the back-up condenser is directly connected to the ignition system, when the power supply voltage of the power source drops, the energy accumulated in the supplementary power source is discharged. Fluctuation of the power supply voltage of the battery is unavoidable, and this causes continuous charging and discharging of the supplementary power source.

Even when the battery power source is experiencing a voltage drop and hence energy is being discharged from the supplementary power source, it is important to have available sufficient power to operate the airbag, i.e., inflate the airbag in the event of an accident. For this reason, the back-up condenser that constitutes the supplementary power source is required to have a large capacity. To compensate for the continuous dropping of the battery power supply voltage, it is also necessary to have a large-capacity step-up (booster) circuit. Such a large capacity circuit and condenser require excess space in the vehicle, thereby taking up space which could be occupied by other systems or be used for passenger space. Furthermore, the step-up circuit requires excess power to operate.

SUMMARY OF THE INVENTION

The present invention thus has as an object the provision of a passenger protection system for vehicles that reduces the capacity of a step-up circuit and also reduces the size of a back-up condenser, which serves as the supplementary power source.

This object is attained by supplying energy from the supplementary power source only when the protection system, i.e., the airbag system, must be operated or when the battery voltage drops to such a level that the airbag would be inoperable.

The passenger protection system for vehicles according to the present invention is equipped with at least one first switching means that operates according to an occurrence of a specified vehicle deceleration. The protection system further includes activation means connected to the power supply device of the vehicle, with connection of the activation means being accomplished by operation of the first switching means to thus activate the passenger protection system. The back-up condenser is connected to the power supply device via a diode. A second switching means is disposed between the back-up condenser and the activation means. The timing of the activation of the passenger protection system, which is activated by the activation means, is detected and simultaneously, the second switching means is activated so that the back-up condenser is connected to the activation means. Furthermore, when a drop of the power supply voltage below a specified value is detected, the second switching means operates so as to connect the back-up condenser and the activation means.

In such a passenger protection system, a supplementary power source such as a back,up condenser is connected to the activation means, which activates the passenger protection system, but this connection is usually disconnected by the second switch means. Thus, the energy charged in the back-up condenser by the power supply device does not discharge. Discharge energy from the back-up condenser is provided to the activation means via the second switching means only when the timing of the activation of the passenger protection system is detected or when the power voltage of the power supply device falls below the specified value. Hence, the capacity of the back-up condenser is minimized and a large capacity of the step-up voltage is not required.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this specification. In the drawings, like reference numerals in different figures represent like parts, and in the drawings:

DETAILED DESCRIPTION OF THE PRESENTLY PREFERRED EXEMPLARY EMBODIMENTS

The preferred embodiments of the present invention will now be described with reference to the attached figures.

Figure 1:
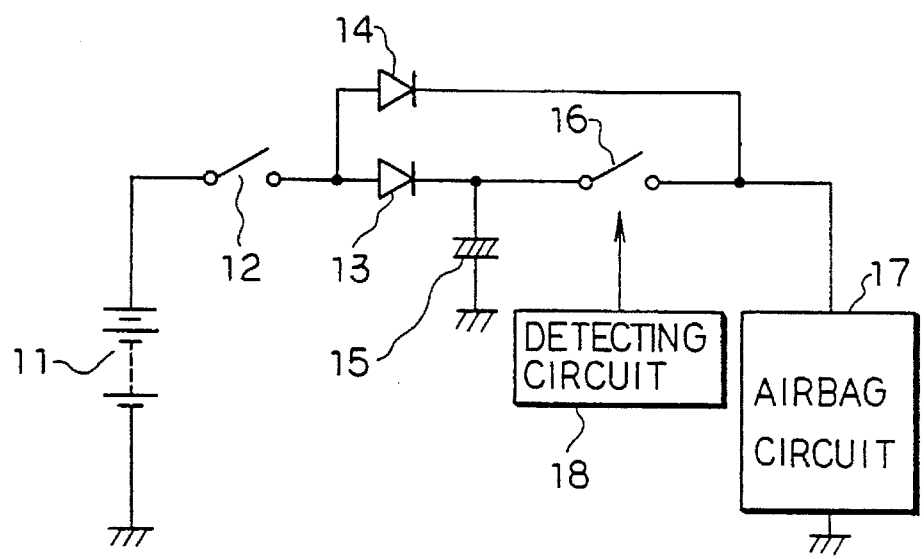
FIG. 1 is a schematic diagram illustrating the general configuration of the protection system according to the present invention.

FIG. 1 illustrates the general schematic diagram for the present invention. Battery 11, which is disposed in the vehicle (not shown) is connected in the forward direction to diodes 13 and 14 via key switch 12. Output from diode 13 is supplied as charging power to back-up condenser 15, and the discharge output from back-up condenser 15 is supplied to airbag circuit 17 via switch 16. Airbag circuit 17 also receives the output from diode 14 directly.

Switch 16 is normally in the open position, but is closed when there is a need to discharge energy from condenser 15 detected by detecting circuit 18. Detecting circuit 18 determines whether energy from condenser 15 needs to be supplied to airbag circuit 17. In response to detecting circuit 18, discharge energy from back-up condenser 15 is supplied to airbag circuit 17.

Figure 2:
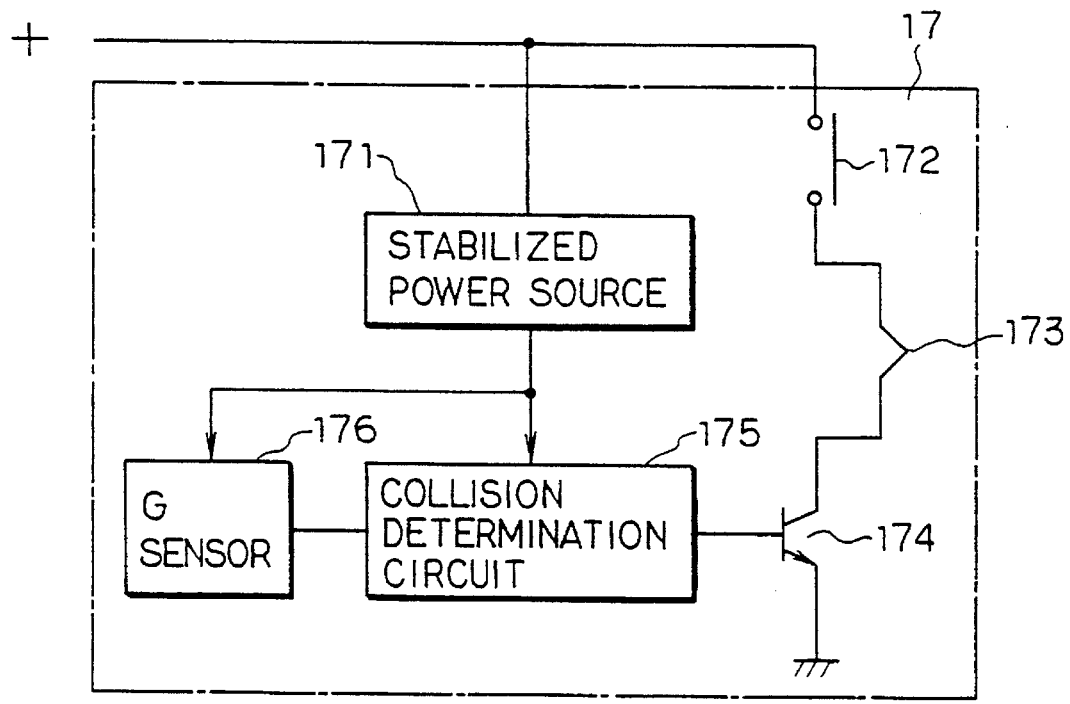
FIG. 2 depicts in detail the airbag circuit of FIG. 1.

FIG. 2 illustrates a detailed schematic diagram of airbag circuit 17. Airbag circuit 17 includes stabilized power source 171 where power obtained via diode 14 and switch 16 is supplied. Airbag circuit 17 further includes ignition device (squib) 173, which includes automatically movable parts switch 172, responsive to vehicle deceleration. Power is supplied to this movable parts switch 172, which operates in the high deceleration state of the vehicle. Ignition device 173, which is equipped for the airbag, is ignited when ignition power is supplied so that so that gas quickly fills the airbag.

Transistor 174 is activated based on the determination output from collision determination circuit 175, which in turn receives the deceleration signal from G sensor 176. When G sensor 176 detects a large, sudden deceleration, the collision determination circuit 175 determines that a vehicle collision has occurred and determines that the airbag should be activated. Based on such a determination, transistor 174 is activated. Stabilized power source 171 supplies power to both collision determination circuit 175 and G sensor 176.

Figure 3:
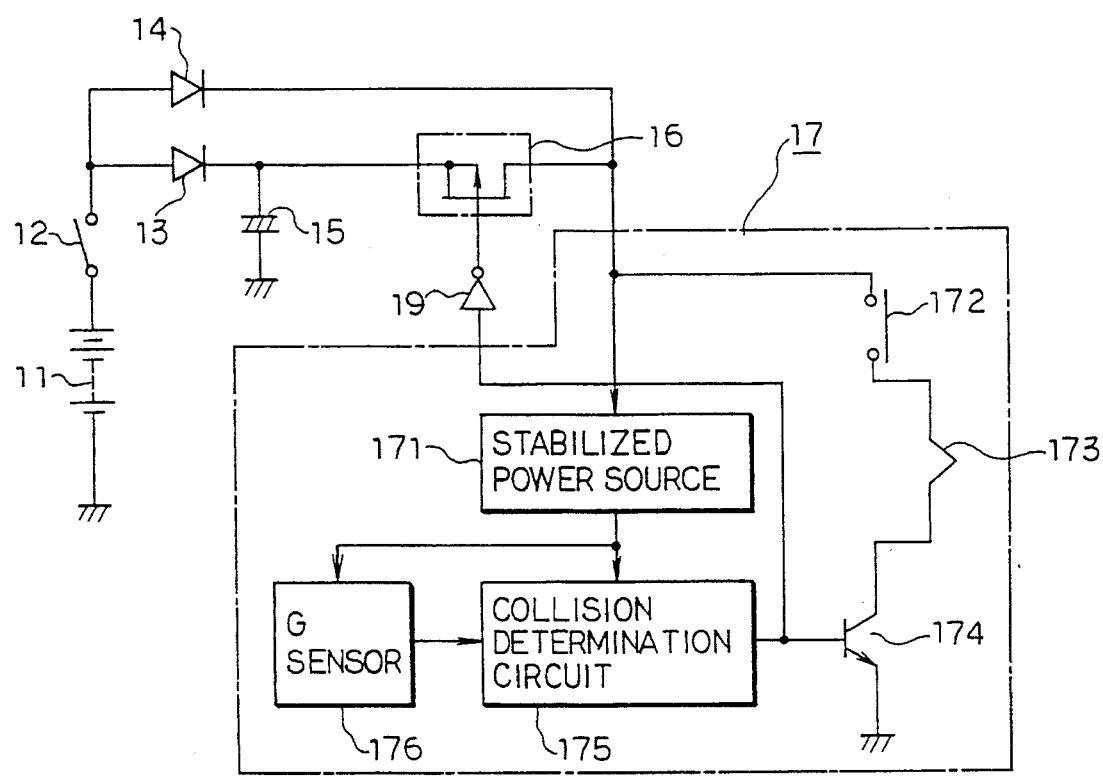
FIG. 3 shows a detailed schematic: diagram of the entire circuit for the passenger protection system according to a first embodiment of the present invention.

FIG. 3 illustrates a detailed schematic diagram showing the details of the system depicted in FIG. 1. Switch 16 is made from, for example, a P channel FET. The signal output from the collision determination circuit 175 of airbag circuit 17 is inverted by inverter 19 and fed to the FET gate making up the switch 16. When no signal is sent from G sensor 176, output from the collision determination circuit 175 is low and a high level signal is sent to the FET gate, causing switch 16 to be set to the open state.

When a large deceleration, i.e., a collision, is detected by G sensor 176, output from collision determination circuit 175 is high and output from inverter 19 goes to low. Thus, the FET gate is closed, hence closing switch 16. Switch 172 is also responsive to decelerations and is closed by the sudden vehicle deceleration.

In the above-described protection system, in the vehicle's normal running condition (no collisions), collision determination circuit 175 does not determine that the vehicle has been involved in a collision. Thus, switches 174 and 16 are both set to the off or open state. In such a state, when key switch 12 is on and the vehicle is running, back-up condenser 15 is charged by battery 11 because the back-up condenser 15 is not connected to the airbag circuit 17. Thus, condenser 15 maintains a specifically charged value.

Even though battery 11 experiences small fluctuations in voltage, back-up condenser 15 continues to maintain a charge at the specifically charged value via diode 13. Simultaneously, airbag circuit 17 is directly supplied by battery 11 via diode 14, thus maintaining its operational status.

When the vehicle collides with something, e.g., another car, a steamroller, a tree, a brick wall, or some other objects, switch 172 is turned on and G sensor 176 detects sudden deceleration. Output from the collision determination circuit 175 becomes high and the transistor 174 is turned on to inflate airbag ignition device 173. As the switch 16 is turned on, which is caused by the deceleration, discharging energy from back-up condenser 15 is supplied to ignition device 173 of airbag circuit 17 and ignited. Thus, the airbag is inflated and the passenger is protected from suffering any harm. The stabilized power source 171 includes a voltage transforming circuit which transforms battery voltage to the specified value and with a small capacity condenser on the input side. Therefore, if the connection of battery 11 is disturbed during the collision, collision determination circuit 175 can turn the transistor 174 and the switch 16 on with the power supplied by the back-up condenser 15.

Figure 4:
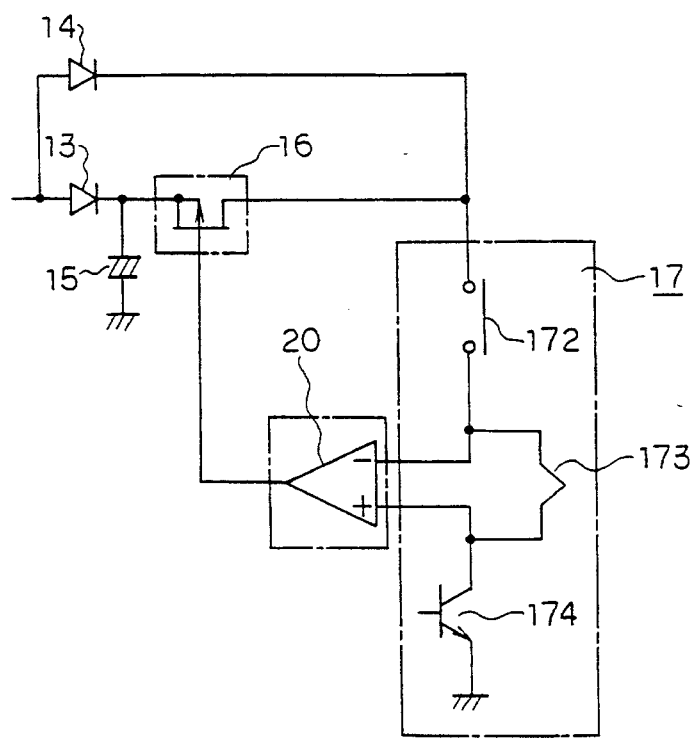
FIG. 4 illustrates a schematic diagram of a second embodiment of the present invention.

FIG. 4, illustrates a second embodiment of the present invention. The potential difference generated between the ends of ignition device 173 is detected by differential amplifier 20, the output of which controls switch 16.

As the switches 172 and 174 are off before the vehicle collides, current cannot flow into the ignition device 173. Thus, the potential difference cannot be detected in the amplifier 20, and the output thereof becomes high. Consequently, switch 16 is opened. When the vehicle collides, switch 174 is set to the on position by collision determination circuit 175 The current then flows in to the ignition device 173 and the potential difference between both ends of the device becomes greater while output from amplifier 20 becomes low. In this state, discharging energy from back-up condenser 15 may be supplied to the ignition device 173.

Figure 5:
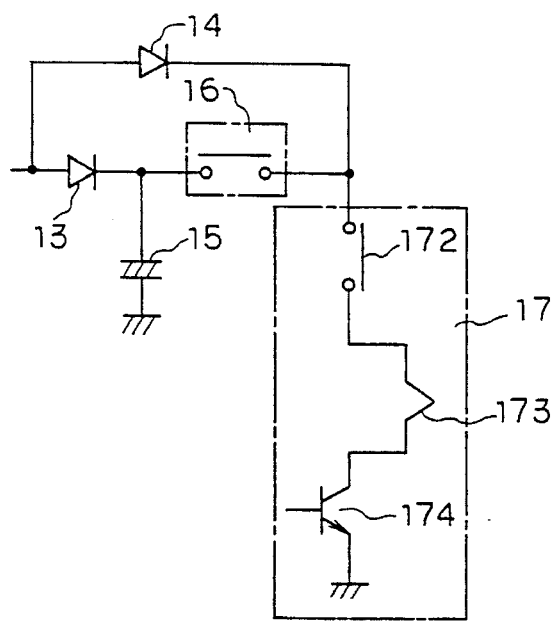
FIG. 5 depicts a schematic diagram illustrating a third preferred embodiment according to the present invention.

In a third embodiment of the present invention, as depicted schematically in FIG. 5, switch 161 as well as switch 172 includes switches which are activated based upon the vehicle deceleration. Thus, switch 16 also includes the function of being able to determine whether discharging energy from back-up condenser 15 is supplied to airbag circuit 17 as well as the ability to switch the energy supply. The circuit configuration appears simple as switch 161 comprises both the second switch means and the connection control means.

Figure 6:
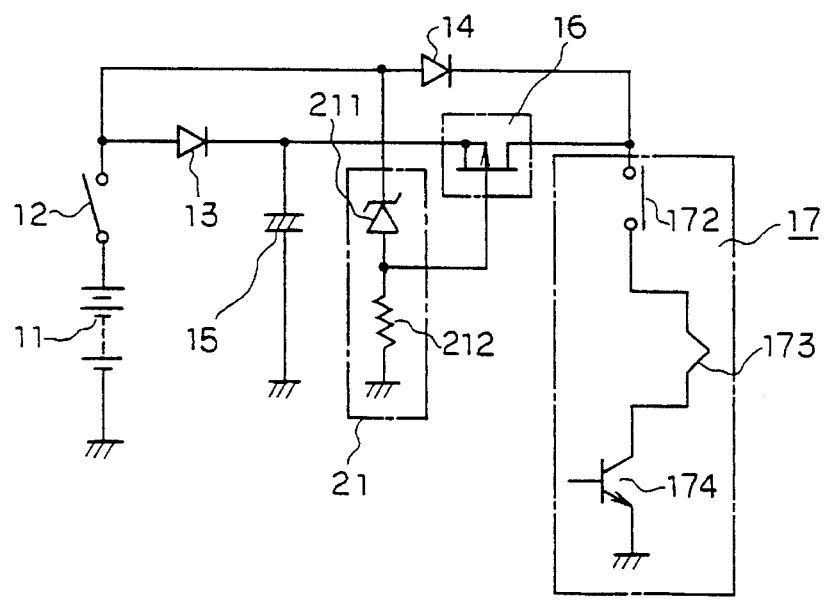
FIG. 6 is a schematic diagram of a fourth embodiment according to the present invention.

FIG. 6 illustrates a schematic diagram of the fourth embodiment of the present invention. Potential monitoring circuit 21 is disposed on the input side of diode 14. Potential monitoring circuit 21 includes zener diode 211 disposed on the input side of diode 14 and resistor 212 grounding zener diode 211.

Potential monitoring circuit 21 monitors the voltage of battery 11 installed in the vehicle. When battery 11 outputs the voltage with which airbag circuit 17 normally operates, switch 16 is set off by the voltage signal obtained from zener diode 211 and resistor 212. If battery 11 were to be disconnected to a collision or the like, or if the voltage of battery 11 drops to a point where airbag circuit 17 cannot operate normally, the amount of current being supplied to the resistor 212 decreases and the terminal voltage thereof decreases. Switch 16 is then activated to close and then discharging energy from back-up condenser 15 is supplied to airbag circuit 17.

Figure 7:
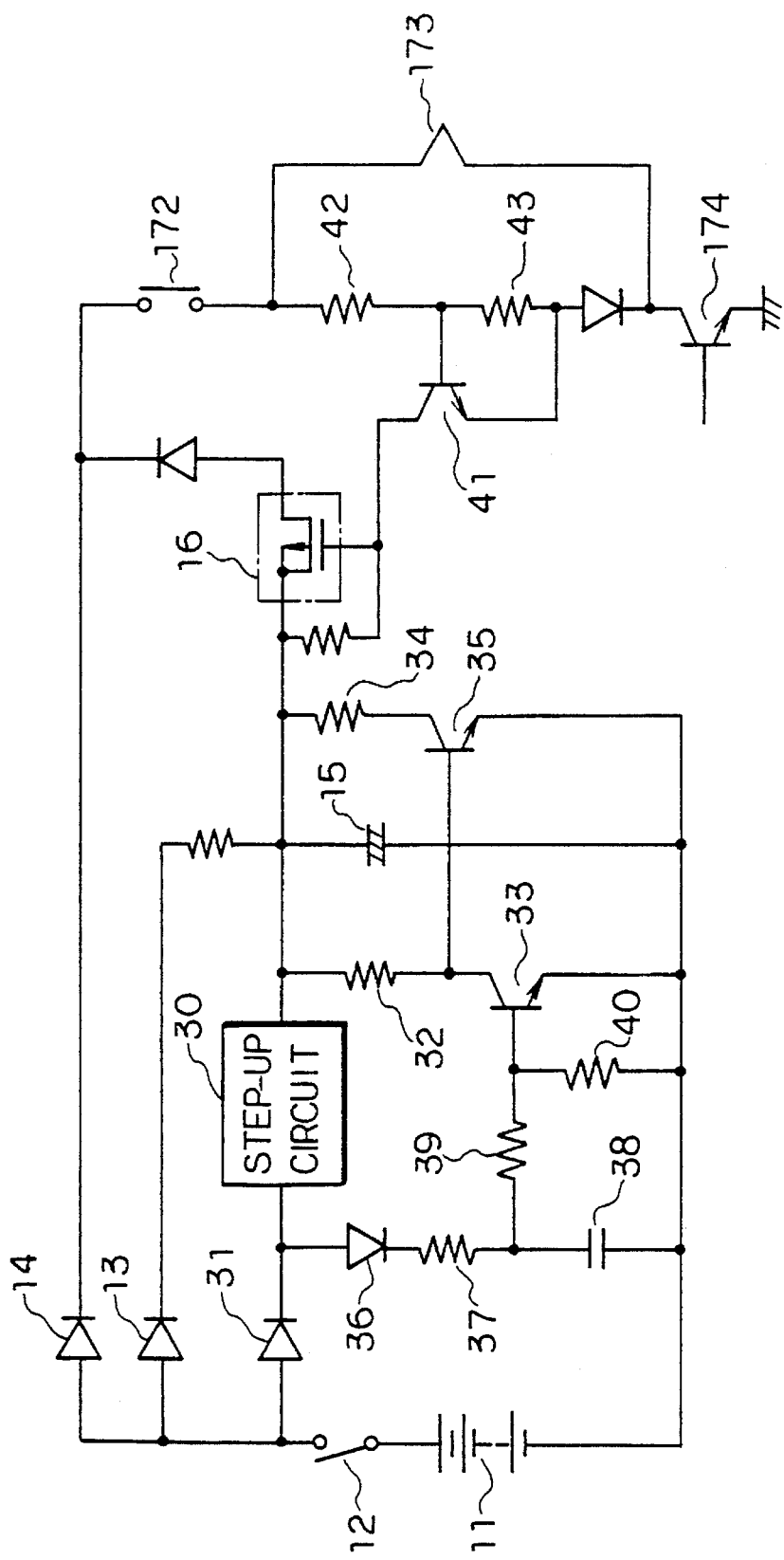
FIG. 7 is a schematic drawing illustrating a fifth embodiment according to the present invention.

FIG. 7 illustrates a schematic diagram of a fifth preferred embodiment according to the present invention. Step-up circuit 30 and the discharging control circuit are set to discharge energy charged in back-up condenser 15 after a specified time has elapsed and after the voltage of battery 11 becomes zero.

Step-up circuit 30 is supplied with power from battery 11 via diode 31. The output of step-up circuit 30 is sent to back-up condenser 15. The voltage of battery 11 is then boosted to be supplied to back-up condenser 15. In this embodiment, the capacity of step-up circuit 30 may be small as long as discharging from back-up condenser 15 is prevented.

Even though the storage capacity of battery 11 drops, use of the step-up circuit 30 allows operation of the airbag circuit by storing sufficient energy in back-up condenser 15. The step-up circuit is preferably constructed from well known elements such as DC-DC converters, charging pumps, etc.

Output from step-up circuit 30 is grounded via resistor 32 and transistor 33. The output is also grounded via resistor 34 and transistor 35. Transistor 35 is connected in parallel to back-up condenser 15. The discharging control circuit is formed by transistors 33 and 35.

Output from diode 31 is grounded via diode 36 and resistor 37 and condenser 38. The connection point of resistor 37 and condenser 38 is connected to the base of transistor 33 through resistor 39. The base of transistor 33 is grounded via resistor 40. Thus, output voltage from battery 11 is supplied to the base of transistor 33 via the CR circuit made up of condenser 38 and resistors 39 and 40. Turning transistor 33 on, the base of transistor 35 is regarded as ground potential and transistor 35 is turned off.

When key switch 12 is turned on, charging voltage from battery 11 is supplied to condenser 38. With the charging of condenser 38, the base potential of transistor 33 increases and transistor 33 is rendered conductive. As the voltage boosted by the step-up circuit 30 is supplied to back-up condenser 15, discharging energy from back-up condenser 15 via resistor 32 is controlled by setting the series resistor 32 serial to transistor 33 at a relatively large resistance value as compared to the transistor 33.

If key switch 12 is turned off, the electric charge on the condenser 38 is discharged via resistors 39 and 40. When the specified time determined by the time constant of capacitor 38 and resistors 39 and 40 passes once key switch 12 is turned off, transistor 33 is turned off. When transistor 33 is turned off, the base potential of transistor 35 increases due to resistor 32 with the electric charge charged in the back-up condenser 15, and transistor 35 is rendered conductive. The electric charge charged at condenser 15 is discharged via resistor 34 and transistor 35.

When the specified time passes after key switch 12 was turned off or battery 11 is cut off, the electric charge charged in back-up condenser 15 is discharged. Thus, energy does not accumulate at condenser 15 that otherwise would keep sufficient energy to activate the airbag circuit. Thus, when the specified time has elapsed, since key switch 12 is turned off or battery 11 is cut off, the discharging energy accumulated in the back-up condenser 15 is needed to activate the airbag immediately after the voltage of battery 11 becomes zero, which signifies that battery 11 has been cut off due to a collision. Thus condenser 15 maintains storage power for activating the airbag system for a period immediately following a collision.

According to the embodiment, preventing discharge from back-up condenser 15 forces condenser 15 to be more compact and the capacity of step-up circuit 30 smaller while the airbag is not operated when key switch 12 is off. Hence, the reliability of the system is greatly improved.

Also, turning switch 16 on and off is controlled by transistor 41. The base of transistor 41 is supplied with voltage from the connection point of resistors 42 and 43. The series circuit of resistors 42 and 43 is connected in parallel to ignition device 173.

The potential difference generated between both ends of ignition device 173 is divided by resistors 42 and 43, with the divided voltage being supplied to the base of transistor 41. When ignition current flows into ignition device 173 and the potential difference between both ends becomes greater, the base potential of transistor 41 increases and transistor 41 becomes conductive. When transistor 41 is on, the FET gate is grounded and switch 16 is turned on. Thus, discharging energy is provided to ignition device 173 from back-up condenser 15 before discharge by transistor 35. The operational principle is the same as that discussed above with respect to the second embodiment. However, due to the combination of transistor 41 and resistors 42 and 43, conduction of ignition current to ignition device 173 can be detected.

Although switch 16 has been described as a P channel FET, switch 16 may also be a bipolar transistor, an N channel FET, etc, or switch 16 can be a relay circuit.

According to the passenger protection system for vehicles described above, a back-up condenser is used as a supplementary power source with the activation device that activates the protection system such as an airbag. Discharging energy is provided to the airbag circuit only when required from the back-up condenser. Thus, the present invention allows the capacity of the condenser to be set to a minimum and allows for a smaller capacity of the step-up circuit. Thus, the control circuit according to the present invention is made more compact and simpler.

The present invention has been described in relation to what are currently considered to be the most practical and preferred embodiments. However, the invention is not to be limited to the disclosed embodiments, but rather is intended to include all limitation, modification and alternative arrangements included within the spirit and scope of the appended claims.

What is claimed is:

1. A passenger protection system for vehicles comprising:

at least one first switch means that operates according to an occurrence of a specified deceleration of a vehicle;

activation means connected to a power source installed in the vehicle, for activating the passenger protection system when the first switch means operates;

a diode;

a back-up condenser connected in parallel to the power source via said diode;

second switch means, disposed between the back-up condenser and the activation means, for changing a connection between the back-up condenser and the activation means; and a connection control means for detecting an activation timing of the passenger protection system and for operating the second switch means and connecting the back-up condenser with the activation means when the activation timing is detected.

2. A passenger protections system for vehicles comprising:

at least one first switch means for operating according to an occurrence of a specified deceleration of a vehicle;

activation means connected to a power source installed in the vehicle, for activating the passenger protection system when the first switch means operates;

a diode;

a back-up condenser connected in parallel to the power source via said diode;

second switch means, disposed between the back-up condenser and the activation means, for changing a connection between the back-up condenser and the activation means; and connection control means for detecting that a power voltage of said power source drops below a specified value and for operating the second switch means and connecting the back-up condenser with the activation means when the power voltage drops.

3. A passenger protection systems, as claimed in claim 2, said connection control means comprising:

discharging means for discharging the electric charge charged to the back-up condenser after a predetermined time from the activation of the passenger protection system for vehicles.

4. The passenger protection system for vehicles as claimed in claim 3, wherein the discharging means includes a detection means for detecting that elapsed time has reached the predetermined time after operation start of the passenger protection apparatus; and wherein discharge of the electric charge charged to said back-up condenser is performed when the elapsed time has reached the predetermined time.

5. The passenger protection system as claimed in claim 3, further comprising a second condenser wherein the discharging means includes a third-switch means for grounding the back-up condenser when the predetermined time has elapsed; and wherein said discharging means is driven by the electric charge charged in said second condenser.

6. The passenger protection system for vehicles as claimed in claim 4, wherein said discharging means includes a charge element that charges with the power voltage from the power source;

a resistance element configured in a discharging route from the charge element; and a third switch means that grounds the back-up condenser when said charge element is discharged to a predetermined level.

7. The passenger protection system as claimed in claim 1, further comprising:

a connection leadwire from the second switch means connected to a segment of a conductor between the power supply device and the activation means; and a second diode connected between the power source and the activation means in parallel to said first mentioned diode and second switch means.

8. The passenger protection system as claimed an claim 1, further comprising:

a voltage step-up means for providing a boosted voltage supply to the back-up condenser.

9. The passenger protection system as claimed in claim 1, further comprising:

a deceleration sensor for detecting the deceleration of the vehicle;

wherein said first switch means is electrically driven according to the deceleration detected by the deceleration sensor; and the connection control drives the second switch means with a driving signal to the first switch means.

10. The passenger protection system as claimed in claim 1, wherein the connection control means includes a voltage detection means for detecting the voltage to the activation means and for driving the second switch means when the voltage increases above a specified value.

11. The passenger protection system as claimed in claim 1, wherein at least one of said second switch means and said connection control means includes a mechanical deceleration switch that connects said back-up condenser to the activation means when a specified deceleration is detected.

12. A passenger protection system for a vehicle comprising:

a power source;

an airbag circuit for inflating an airbag;

first switch means;

second switch means for keeping said airbag circuit operative;

a condenser connected between said first switch means and said second switch means for storing electrical energy from said power source to supply the stored energy to the airbag circuit when said first switch is closed;

said first switch means being responsive to deceleration of said vehicle for disconnecting said condenser from a portion of said system when said first switch means is open; and directional coupling means for maintaining a power level from said power source to said condenser.

13. A passenger protection system as claimed in claim 12, further comprising detection means for determining whether energy is needed from said condenser.

14. A passenger protection system as claimed in claim 12, wherein said airbag circuit includes:

a sensor for sensing vehicular deceleration;

means for determining that the airbag should be inflated in response to an output of said sensor; and an ignition device reactive to an output of said determining means and which inflates the airbag.

15. A passenger protection system as claimed in claim 12, wherein said power source is a battery installed in said vehicle.

16. A passenger protection system as claimed in claim 13, wherein said first switch means is selected from the group consisting of a P channel FET, a bipolar transistor, an N channel FET, and a relay circuit.

17. A passenger protection system as claimed in claim 14, wherein said determining means controls a switching element of said first switch means.

18. A passenger protection system as claimed in claim 14, wherein when said determining means outputs a high signal, said first switch means is closed, said high signal being inverted by an inverter prior to being supplied to said first switch means.

19. A passenger protection system as claimed in claim 14, wherein said determining means comprises an amplifier for detecting activation of said airbag, an output of which controls said first switch means.

20. A passenger protection system as claimed in claim 12, wherein said directional coupling means is a diode.

21. A passenger protection system as claimed in claim 12, further including a potential monitoring circuit for monitoring voltage of said power source and closing said first switch means when a monitored voltage is decreased.

22. A passenger protection system as claimed in claim 21, wherein said potential monitoring circuit includes a zener diode and means for supplying a resistance.

23. A passenger protection system, as claimed in claim 2, wherein:

said passenger protection apparatus is an airbag;

said activation means is an airbag circuit for inflating said airbag; and said connection control means includes a step-up circuit for operating said airbag circuit when power of said power source drops, a discharge control circuit for controlling timing of discharge of said condenser, and means for discharging power from said condenser at a controlled timing of discharge after said first switch is turned to an off position.

24. A passenger protection system as claimed in claim 23, wherein said power source is a battery.

25. A passenger protection system as claimed in claim 23, wherein said airbag circuit includes:

an ignition device for activating said airbag;

a series circuit including resistors disposed parallel to said ignition device for producing an output when said ignition device is activated; and a second switch for activating said ignition device by the stored power from said condenser in response to output of said series circuit.

* * * * *